Jan. 29, 1957 G. T. HEMMETER 2,779,196
WHEEL BALANCER
Filed Aug. 28, 1952 4 Sheets-Sheet 1

INVENTOR.
GEORGE T. HEMMETER
BY
ATTORNEY

Jan. 29, 1957  G. T. HEMMETER  2,779,196
WHEEL BALANCER
Filed Aug. 28, 1952  4 Sheets-Sheet 2
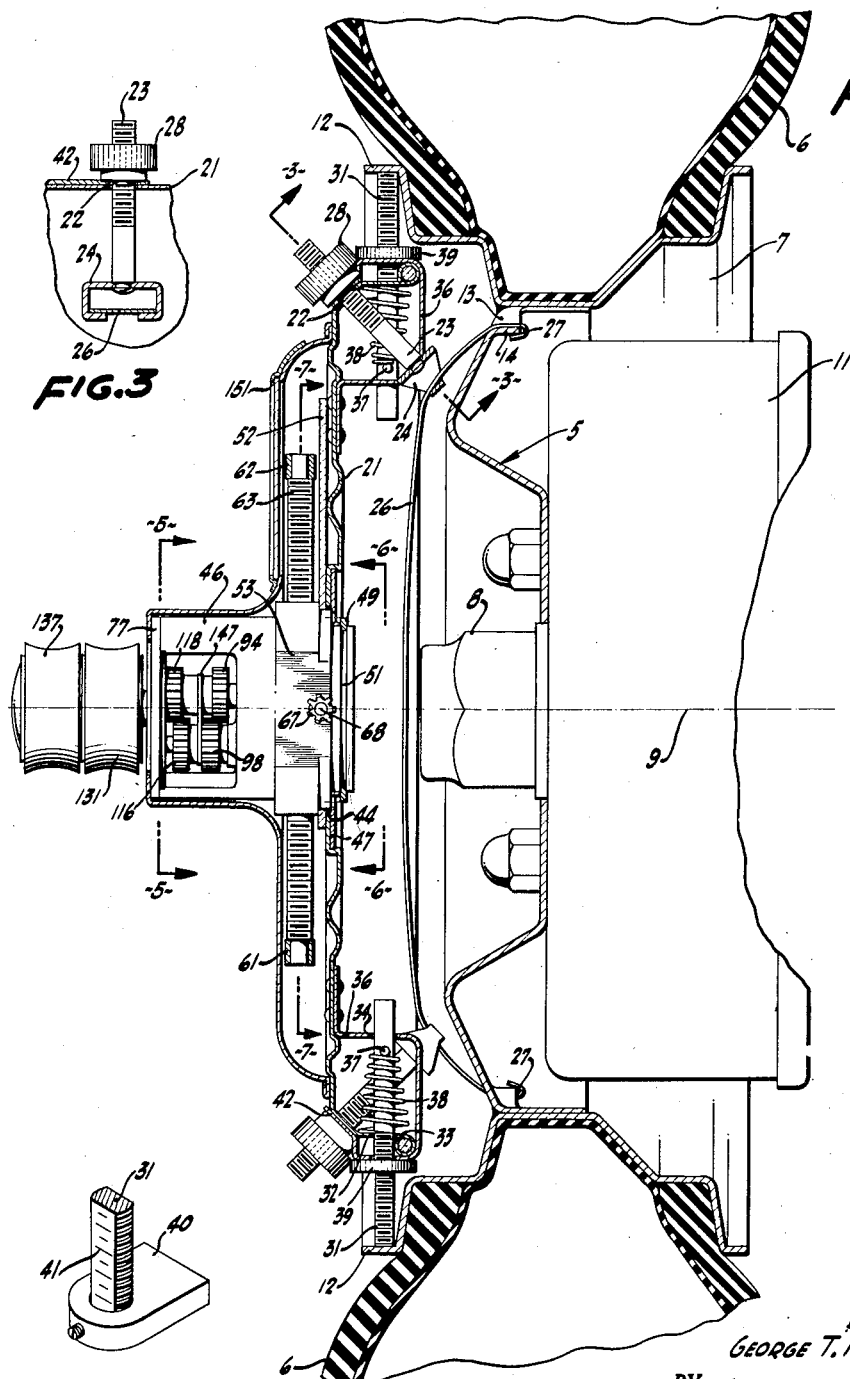
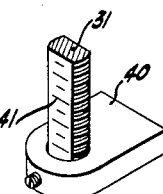
INVENTOR.
GEORGE T. HEMMETER
BY
Marcus Lothrop
ATTORNEY

INVENTOR.
GEORGE T. HEMMETER
BY
ATTORNEY

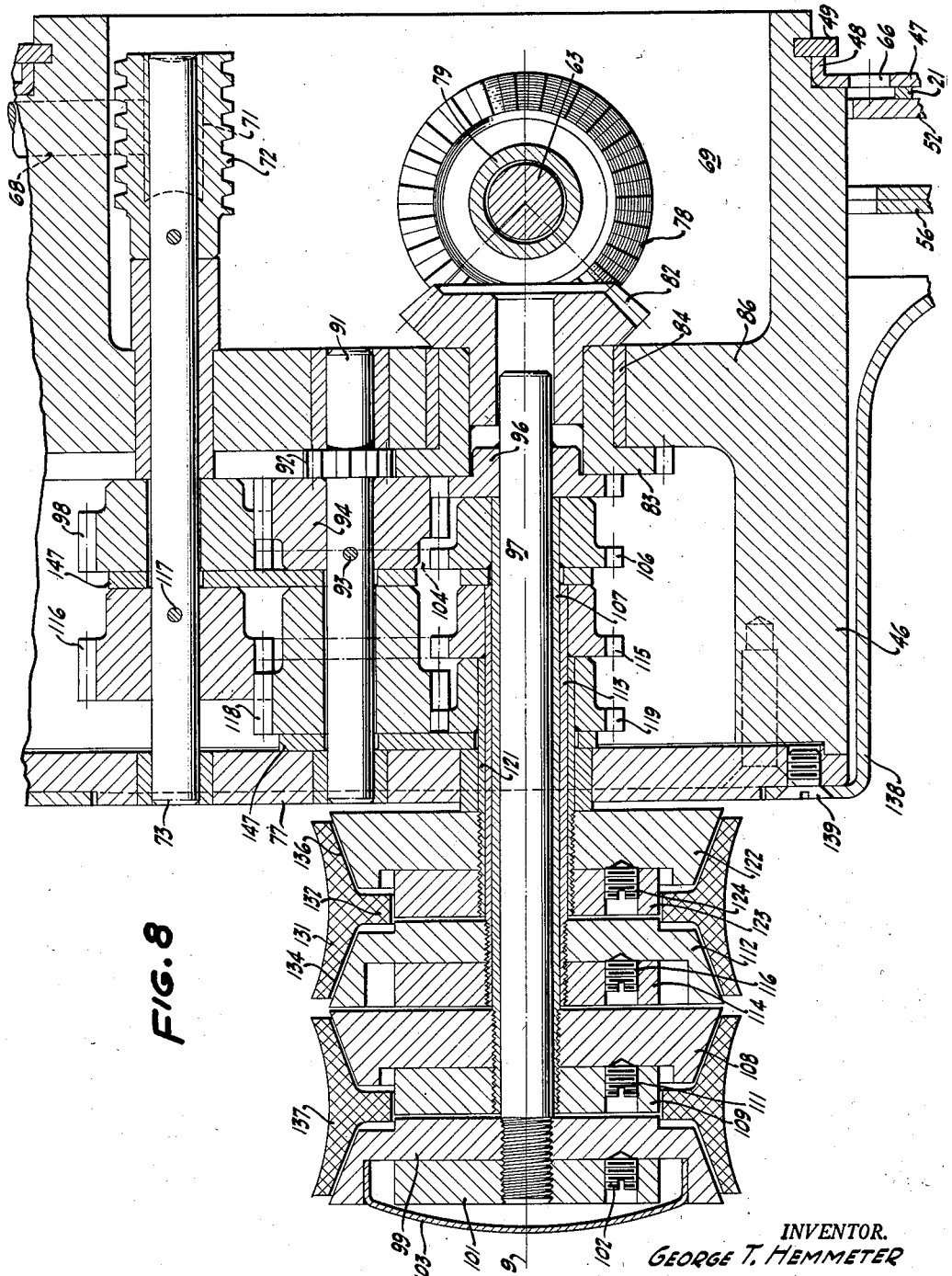

United States Patent Office 2,779,196
Patented Jan. 29, 1957

2,779,196

WHEEL BALANCER

George T. Hemmeter, Los Altos, Calif.

Application August 28, 1952, Serial No. 306,911

14 Claims. (Cl. 73—458)

My invention relates to devices for use in determining the position and mass of a compensating weight which will create a balanced condition in an otherwise unbalanced body, especially such as an automobile wheel and tire without detachment from the vehicle. It is particularly concerned with a mechanism applicable to an automobile wheel while it is in place and effective, upon suitable rotation of the wheel, and upon manipulation by an operator to indicate the polar or rotated position of unbalance. Balancing devices of this general nature and for this general purpose are well known. They are deficient however in ease and security of application and simplicity and speed of operation, in accuracy of indication, and in safety. With increasing automobile speed it becomes increasingly necessary to provide an accurate dynamic balance of the vehicle wheels. While under some circumstances it is possible effectively to balance a wheel and tire on special spindles, such devices do not necessarily compensate for unremovable parts such as brake drums, axles or improper machine parts. Therefore, it is preferable under most circumstances to balance the rotating parts while they remain on the vehicle. This is partly for the reason that then all rotating parts affecting wheel balance, such as the brake drum, the disc wheel, wheel lugs, etc. are included in the rotating mass and therefore if unbalanced, they may be compensated for. Also, this procedure is beneficial because it saves a good deal of labor. In order to simulate high speed operation, which accentuates the effect of out of balance during the balancing operation, the parts are rotated at relatively high speed, i. e. equivalent to motoring speeds as high as 100 m. p. h. Obviously it is essential to have a secure arrangement for attachment of the apparatus effectuating the balancing, else it may accidently become dislodged from the wheel with disastrous results.

It is therefore an object of my invention to provide an improved on-the-car wheel balancer.

Another object of my invention is to provide an attachment device such that the balancer can readily be applied to a wheel and inspected while it is in place on a vehicle and such that it can safely be operated at high rotative speeds.

Another object of the invention is to provide a balancer which affords a quick and accurate indication of the position and the amount of compensating mass to effect a balance on an otherwise unbalanced wheel.

A further object of the invention is to provide a wheel balancer which can be readily installed by an operator, and one which has a minimum of control devices, and which retains accuracy of indication indefinitely.

A still further object of the invention is to provide a wheel balancer which is readily usable on wheels of various designs and sizes.

A still further object of the invention is to provide a wheel balancer which is simple to operate and which has a minimum number of controls.

Other objects together with the foregoing are obtained in the embodiment of the invention described in the accompanying description and illustrated in the accompanying drawings in which Figure 1 is a side elevation of a wheel balancer mounted on a wheel rim, portions of the figure being broken away to reduce its size.

Figure 2 is a cross section, the planes of which are indicated by the lines 2—2 of Figure 1 and with parts of the figure broken away to reduce its size. A sectional portion of a tire and tube have been added for clarity.

Figure 3 is a detail in cross section, the plane of which is indicated by the line 3—3 of Figure 2.

Figure 4 is a detail of a centering screw terminal.

Figure 8 is an enlarged detail in cross section through the gear case, the various planes of which are indicated by the line 8—8 of Figure 5.

Figure 1:
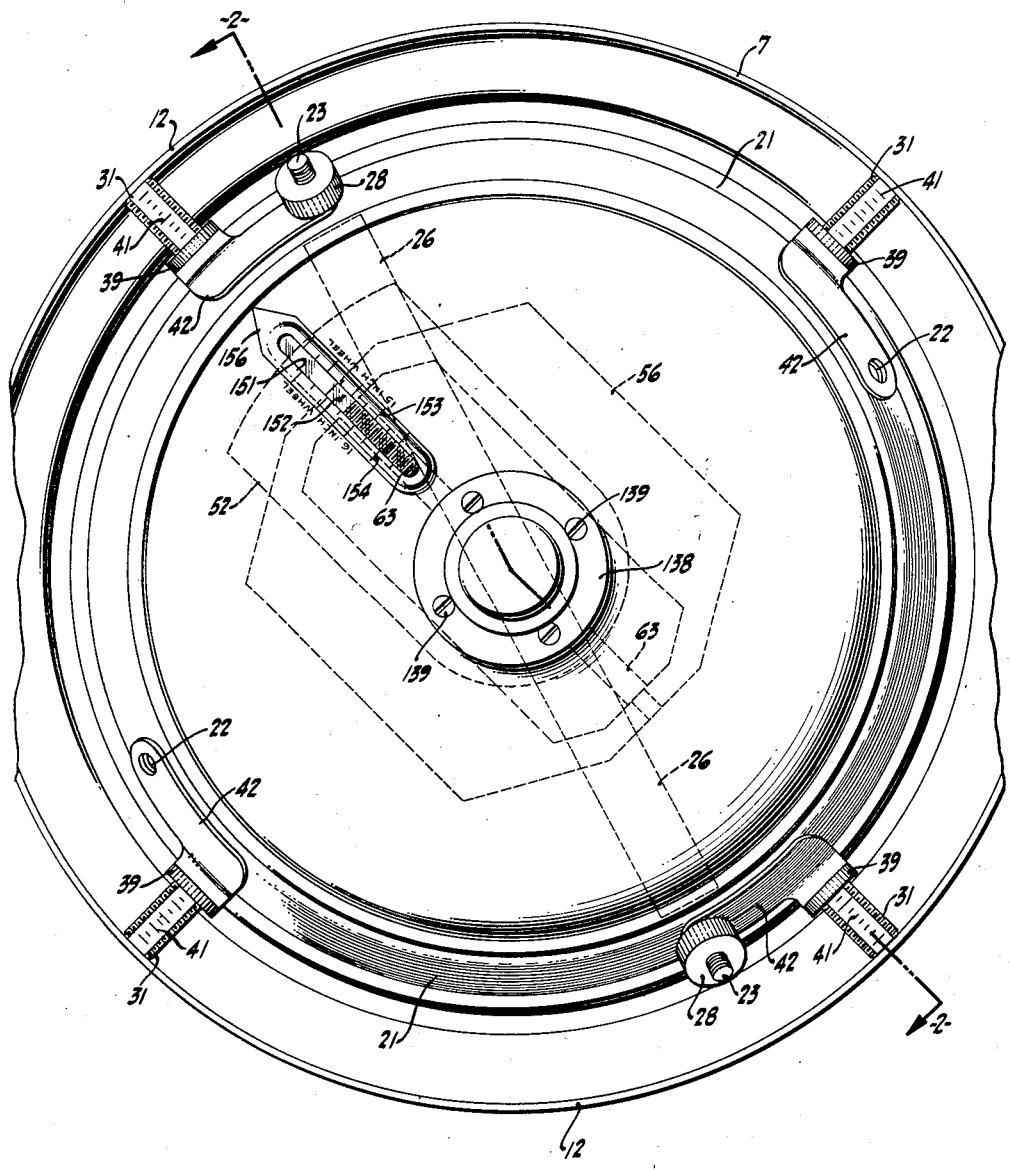
Figure 5:
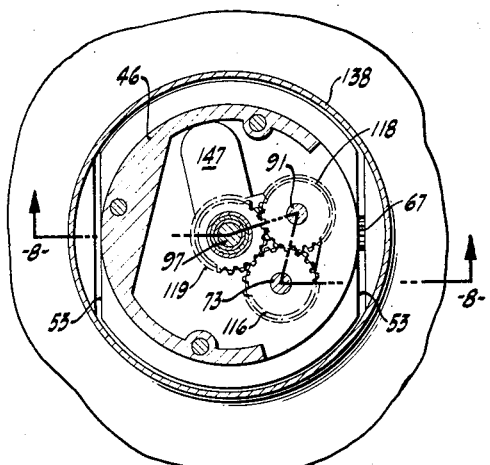
Figure 5 is a detail in cross section of the gear case, the plane of which is indicated by the line 5—5 of Figure 2.

In the customary circumstances the wheel balancer is utilized in connection with an automobile wheel 5 including a tire 6 mounted on a rim 7, fastened on an axle support 8 and designed to rotate about an axis 9. A brake drum 11 is also rotatable with the wheel. The rim 7 is customarily provided with a peripheral, outstanding flange 12, while the wheel 5 is perforated with one or more openings 13, leaving margins 14.

Included in the wheel balancer is a base plate 21 preferably fabricated of relatively thin metal and of a size to fit within the confines of the smallest wheel normally encountered. The base plate 21 is provided with a number of peripheral apertures 22 preferably diametrically disposed for the reception of take-up screws 23. These screws are disposed at an inclination to the rotational axis 9 so that their movement with respect to the base plate 21 through the apertures 22 is in a direction having both a radial component and an axial component. Each of the take-up screws 23 at its inner end is provided with an eye 24 overlying and freely in engagement with a strap 26. The strap 26 is preferably of a yieldable or spring like material and is provided on its opposite ends with inturned portions 27. These afford hooks insertable through the openings 13 and engageable with the margins 14 to afford a diametrical strap extending across the axis 9 and providing a very firm, secure and safe inter-connection with the wheel 5.

The take-up screws 23 are provided with nuts 28, preferably thumb nuts, in engagement with the base plate so that upon operation of the nuts 28 the strap 26 can be tightened to a substantial degree. The nuts 28 are removable so that the base plate 21 can be threaded over or withdrawn from the take-up screws for applying the structure to or removing it from the wheel. The effect of the take-up screws and the strap 26 is to relate the base plate 21 firmly to the wheel so far as its axial displacement is concerned.

In order to afford a correct radial relationship between the base plate and the wheel or to center the base plate on the wheel despite variations in the wheel diameter or, in other words, to mount the base plate 21 so that it is coaxial with the axis 9, the base plate is provided with a number of radially disposed centering or chucking screws 31. These screws 31 have been milled with two flat parallel faces to prevent rotation when passed through fitted openings 32 in an inturned flange 33 formed as part of the base plate 21 and are also extended to pass through similar fitted openings 34 in guide brackets 36 included in the base plate structure.

Each of the centering screws has a cross pin 37 against which one end of a conical expansion spring 38 rests. The other end of the expansion spring rests against a part of the flange 33 so that the tendency of the springs is to urge the centering screws radially inwardly. Each of the centering screws is also provided with a thumb nut 39 engaging the threaded stem of the screw and lying against the rim of the base plate. The outermost extremities of the centering screws are adapted for abutment or engagement with the out turned flange 12 of the rim of the wheel. If desired, a special terminal 40 on the centering screw is useful in contacting flanges of special kinds (see Figure 4). The extension of the screws 31 for centering is accomplished by appropriate rotation of the thumb wheels 39.

In order that the centering can be readily accomplished, measuring indicia 41 are displayed on the flat faces of the screws 31 so that the operator by setting the same indicia adjacent the edge of the thumb screw can assure center mounting of the base plate. Sinch both the thumb nuts 39 and the nuts 28 are operated quite frequently against the base plate a number of reinforcing tabs 42 are suitably positioned on the flange 33. By appropriate assembly and manipulation of the various centering and take-up screws the base plate 21 is mounted for concentric, coaxial rotation with the wheel. Furthermore, with a little care in positioning the centering screws with respect to the edge of the flange 12, the operator can easily mount the base plate 21 with its general plane of rotation quite accurately perpendicular to the rotational axis 9.

In accordance with my invention, I provide means on the base plate 21 for assisting in ascertaining the position and amount of compensating mass required to balance the rotational assembly. The wheel balancer when properly installed and centered and adjusted for zero compensation is inherently in dynamic balance such that if unbalance is indicated by vibration of the rotating mass it is due only to that present in the rotating automobile assembly, including the tire 6, the wheel 5 and the brake drum 11, for example.

The base plate 21 is manufactured with a central opening 44 within which a hub 46 is disposed coaxially with the axis 9. A reinforcing ring 47 is gripped in an appropriately contoured portion of the base plate and has a cylindrical flange 48 to serve as a journal support for the hub 46. A snap ring 49 engages a groove 51 in the hub and precludes axial displacement of the hub with respect to the base plate while affording relative rotation therebetween.

Mounted on the hub 46 is one of a plurality of weights more particularly an eccentric weight 52 preferably comprised of a relatively flat, eccentric member provided with an aperture to fit around the hub 46 and non-circular so as to be keyed thereto by virtue of flats 53 formed on the hub to engage with the eccentric weight. Cooperating with the eccentric weight 52 is a diametrical weight 56. This latter weight is preferably a rectangular sheet of material comparable to the eccentric weight 52 and is provided with a non-circular and enlongated opening 57 adapted to key to the sides 53 of the hub for rotation therewith and for radial displacement relative thereto.

The diametrical weight 56 is provided with end bridges 58 and 59, enlarged to provide anchors 61 and 62 for a screw shaft 63. The shaft is held against rotation within the anchors and is shouldered so that it is not radially displaceable relative to the diametrical weight. The mass of the diametrical weight 56 and the screw shaft 63 with respect to the mass of the eccentric weight 52 is such that when the weight 56 and the shaft 63 are positioned diametrically opposite the eccentric weight 52 and at the extreme of their designed movement as measured from the axis 9 as a center, the weights are statically in balance. When the diametrical weight 56 is displaced radially to the opposite extreme of its designed travel and generally overlies the eccentric weight 52, the two masses are cumulative in producing a centrifugal effect when rotated about the axis 9.

Means are provided for rotating the eccentric weight 52 about the axis 9 as a center and with respect to the base plate 21 as a datum and means are also provided for simultaneously rotating or revolving the diametrical weight 56 relative to the base plate 21 and also for producing radial translation of the diametrical weight with respect to the base plate 21. Thus, upon rotation, the centrifugal force of the diametrical weight either augments the centrifugal effect of the eccentric weight or offsets partially or entirely the centrifugal effect of the eccentric weight. The result, therefore, is that the centrifugal forces of the two weights either offset or neutralize each other completely or in part or are cumulative. Since they are polarly displaceable with respect to the base plate, they can be arranged to offset a diametrically opposite unbalance, and since the diametrical weight is readily displaceable, it can be set so that the amount of the inherent unbalance of the wheel is exactly compensated for.

Figure 6:
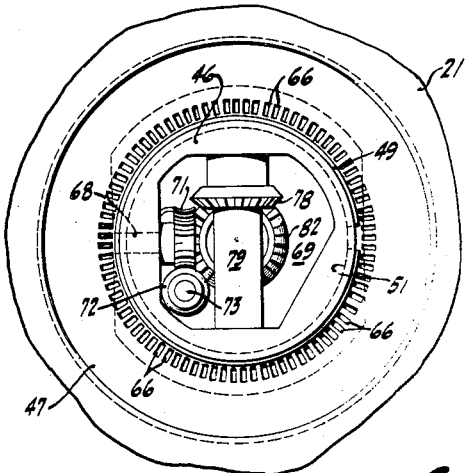
Figure 6 is a cross section, the plane of which is indicated by the line 6—6 of Figure 2.
Figure 7:
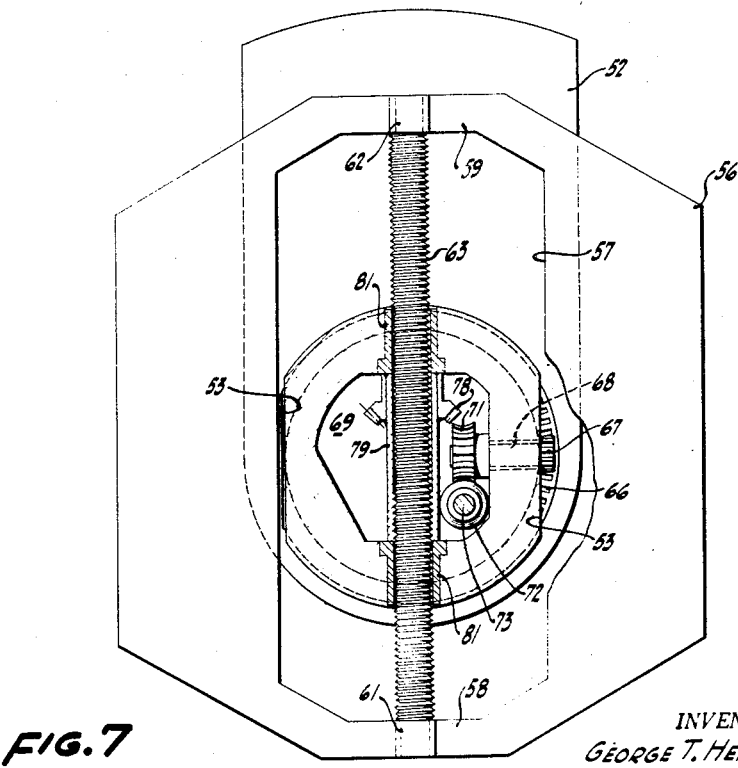
Figure 7 is a cross section, the plane of which is indicated by the line 7—7 of Figure 2.

Particularly as shown in Figures 6 and 7, it is arranged that the ring 47 is perforated with circumferential openings 66 constituting the teeth of a ring gear. Meshing with the ring gear is a pinion 67 near the end of a shaft 68 journaled in the hub and extending from the hollow center 69 thereof to the periphery of the hub. On its inner end, the shaft 68 is provided with a worm gear 71 meshing with a worm 72 fast on the end of a driven shaft 73. Upon rotation of the driven shaft 73 relative to the hub 46, the worm 72 is rotated, the worm gear 71 is revolved and the shaft 68 and the pinion 67 are likewise turned. Because of the intermeshing between the pinion 67 and the ring gear 66, the hub is revolved relative to the base plate and since the eccentric weight 52 and the diametrical weight 56 are non-rotatable relative to the hub, such weights likewise revolve or are polarly displaced with respect to the base plate.

In order that the diametrical weight 56 can be moved radially, the screw shaft 63 is driven by a miter screw gear 78 disposed within the chamber 69 and fast on a tube 79. The tube 79 has internal threads engaging the shaft 63 and abuts bushings 81 at its opposite ends and so is freely rotatable but held against axial displacement. Meshing with the miter screw gear 78 is a similar miter gear 82 joined for rotation with a journal gear 83. The journal gear 83 and the miter gear 82 are pressed tightly together to run in unison in a bushing 84 mounted in a cross wall 86 of the hub 46. Rotation of the journal gear 83 produces a comparable rotation of the miter gear 82 and through the miter screw gear 78 revolves the sleeve 79. This provides an endwise displacement of the screw shaft 63 held against rotation in the diametrical weight 56. Consequently, rotation of the journal gear 83 produces a displacement of the diametrical weight 56, the direction of displacement depending upon the direction of rotation.

In accordance with my invention, I have provided special means for producing rotation of the driven shaft 73 in either direction in order to produce a clockwise or a counter-clockwise polar rotation of the diametrical weight and of the eccentric weight with respect to the base plate. Likewise, I have provided means for producing a relative rotation between the gear 83 and the hub 46 in either direction in order to afford the desired displacement radially of the diametrical weight. For this reason, a jack shaft 91 is journaled in the hub between the cover 77 and the transverse wall 86. The jack shaft carries fast on it a pinion 92 meshing with the journal gear 83.

Also mounted on the jack shaft and fastened thereon by means of a pin 93 is a broad pinion 94 part of which meshes with an idler gear 98 freely rotatable on the shaft 73. A gear 96 meshing with the pinion 94 is secured, as by welding after assembly, on a driving shaft 97, one end of which is journaled within the hub of the bevel gear 82 and the other end of which projects a substantial distance from the base plate 21. A clutch cone 99 is disposed on the outer end of the driving shaft 97 and is locked on such shaft for rotation in conjunction therewith by a lock disc 101 pinned in place by a set screw 102. A shield 103 covers the machinery and adds to the appearance.

Upon rotation of the clutch cone 99 in either direction with respect to the hub 46, the gear 96 is revolved and in turn rotates the gear 94 and the idler 98. Since the gear 94 is pinned by the pin 93 to the idler shaft 91, it causes a simultaneous rotation of the pinion 92 and of the journal gear 83 and the rest of the connecting structure. The idler gear 98 likewise is a mesh (indicated by the broken line 104 in Figure 8) with a gear 106 fastened, as by welding or brazing on and to a hollow driving shaft 107. This shaft is freely rotatable on the driving shaft 97 and is coaxial with such shaft on the axis 9. The hollow driving shaft 107 at its outermost end carries a clutch cone 108 which is adjacent to but in opposite inclination with regard to the clutch cone 99. A locking disc 109 secures the clutch cone 108 on the driving shaft 107 while a set screw 111 secures the parts in position. Thus, when the cone 99 is rotated with respect to the hub 46, the companion cone 108 is rotated with respect to the hub in the opposite direction through the gear train just mentioned.

In a somewhat similar fashion a clutch cone 112 is mounted on a hollow driving shaft 113 coaxial with the axis 9 and is secured thereon by a lock disc 114 and a set screw 116. The clutch cone 112 rotates the driving shaft 113 and simultaneously rotates therewith a pinion 115 fast on the driving shaft and meshing with a driven gear 116 on the driven shaft 73, being fastened thereto by a pin 117. The driven gear 116 is relatively wide and is also meshed with an idler gear 118 journaled for free rotation on the jack shaft 91. The gear 118 is meshed with a pinion 119 secured as by welding to a hollow driving shaft 121 concentric with the axis 9 and extending beyond the cover 77 to a clutch cone 122 opposite to and the companion of the clutch cone 112. The cone 122 is locked to the driving shaft 121 by a locking disc 123 and a set screw 124. When the cone 112, for example, is rotated relative to the hub 46, its companion cone 122 is rotated in the reverse direction and vice versa.

In the normal operation of the structure, the wheel 5 is rotated around the axis 9. The base plate 21 and all of its attendant balancing structure rotates in unison with the wheel. The gearing likewise rotates as a body and the coaxial driving shafts also rotate in unison with the remainder of the structure about the axis 9 as a center. The friction of the various parts is such that there is no lagging and the rotation is unitary. Advantage is taken of this situation to produce a relative rotation between the various driving shafts, 97, 107, 113 and 121 and the hub 46.

A manual drum 131 having a concave grooved outer surface for easy manual engagement by the operator, has a central rib 132 freely journaled on the disc 123. The manual drum is provided with a pair of internal conical surfaces 134 and 136 of identical taper to that of their mating cones 112 and 122. The parts are proportioned such that axial displacement of the drum in either direction causes a binding action between one set or the other of the clutch parts. The drum 131 is constructed of a light weight friction material such as plastic, leather or compressed fiber, thus it has little momentum and is easily grasped and stopped by the operator during the balancing operation. Being of the mentioned material the thermal conductivity is low hence the operator experiences no discomfort due to heating of the drum during clutching operation for balancing.

When the held drum is shifted by the operator either toward the base plate 21 or away from the base plate, its face 136 engages the cone 122 or its face 134 engages the cone 112. In the first instance upon engagement with the cone 122, that cone is stopped relative to the operator and rotates relative to the hub 46 or, differently considered, the cone 122 is stationary and the hub 46 rotates around it. The gear 119 is therefore stopped and the result is that the shaft 73 is rotated. This produces a polar displacement of the eccentric weight and of the diametrical weight.

When the manual drum 131 is moved in the opposite direction, the cone 122 is freed, the cone 112 is arrested, the gear 114 is stopped, whereupon the shaft 123 is then rotated in the reverse direction to produce a contrary polar orientation of the eccentric weight and of the diametrical weight relative to the base plate 21. When the manual drum 131 is released by the operator, it disengages because the tangent of the cone angle of the clutch by design is greater than the coefficient of friction between the drum material and the mating cone 112 and returns to its intermediate neutral position so that no further driving effort is expended on the shaft 73.

Quite similarly, there is a second manual drum 137 freely journaled on the locking disc 109 for engagement with the cone 99 or with the cone 108. If engagement is with the cone 108, the driving shaft 107 is held stationary and the idler shaft 91 is revolved so that the screw tube 79 is rotated and the diametrical weight is radially displaced. During this time the cone 99 revolves freely in the opposite direction. Correspondingly, when the manual drum 137 is shifted in the reverse fashion to engage the cone 99, the driving shaft 97 is held, the gear 96 being held with it, and the jack shaft 91 is revolved in the reverse direction so that the screw shaft 63 and the diametrical weight are translated radially in the reverse sense. When the manual drum 137 is released it is restored to its center position and no driving or displacement of the diametrical weight ensues. Washers 147 prevent unwanted rotation of the polar displacement system by the weight translating and vice versa.

In order to take advantage of this ability to displace the weights with respect to the base plate, there is provided on the hub 46 adjacent to its outermost portion a circular shield 138 held by fasteners 139 on the cover 77 of the hub 46, and being contoured closely to enclose the hub and to overlie the several weights. The shield abuts quite closely against the base plate 21, although the shield is rotatable relative thereto. The shield is embossed and perforated to provide a radial window 151 through which a pointer 152 on the diametrical weight is visible. The shield adjacent to the edge of the window is provided with a scale 153 to indicate, preferably in terms of ounces, the mass of the counterbalancing weight required to compensate for wheel unbalance; that is the weight that must be added to the wheel rim to bring it into balance. Preferably the the scale 153 is calibrated or set for a predetermined wheel diameter, say a 15 inch wheel, and is supplemented by a similar scale 154 computed for use in connection with a 16 inch diameter wheel. However, the scale could be calibrated in inchounces for use with any diameter wheel. Furthermore, there is afforded an arrow pointer 156 or other suitable indicium to indicate externally on the shield the rotated position relative to the base plate 21 of the eccentric weight and of the diametrical weight which is the location that the counterweight must be attached to effect a balance.

In the use of this structure, the vehicle wheel 6 is lifted from the ground by a bumper jack until the wheel assembly is hanging on the car springing system. The strap 26 is applied to the wheel. The base plate 21 and its attendant balancing mechanism is threaded over the take-up screws 23 and is loosely and uniformly fastened by the nuts 28. At the same time, the centering screws 31 are put in position against the rim 12 and the nuts 32 are adjusted so that the device is centered on the axis 9. The parts are then all made secure. The out of balance wheel 5 is revolved at a speed preferably above the critical speed of the wheel assembly by external means (not shown) and the entire attached assembly revolves about the axis 9. Inasmuch as the rotating mass is suspended on the car springing system which is essentially a free spindle system, any unbalance will create a vibration of the wheel and the car of which it is a part. The manual drum 137 is moved either to or fro along the axis 9 until the diametrical combination of the eccentric weight and the diametrical weight produces a substantial unbalanced effect. The manual drum 131 now moved either to or fro along the axis thereby causing polar rotation of the weights with respect to the wheel and until the shaking or vibration of the wheel assembly is minimized. The rotated position so found is indicated by the position of the arrow 156 relative to the tire 6 and or the wheel 5. Under these circumstances, the centrifugal force created by the balancer has been polarly displaced or rotated until it is diametrically opposed to the unbalanced force of the wheel. Next, the manual drum 137 is again shifted either toward or away from the base plate and this causes a change in the amount of the compensating centrifugal force produced by the diametrical shifting of the diametrical weight. This displacement and adjustment of compensating weights more and more closely offsets the wheel unbalance and finally a position is obtained in which the counterbalancing is most nearly correct. This position and the magnitude of the compensating weight required for counterbalancing are evidenced by the relative location of the pointer 152 with respect to the scale 153 or the scale 154 and the polar location of the arrow pointer 156. The wheel is stopped and the operator makes a proper reading, using the scale appropriate for the particular wheel diameter being tested. The correct circumferential location of the counterbalancing weight, is evidenced by the indicium 156, and the correct indication of the amount of counterbalancing weight to be used is discernable from the reading on the index 153 or 154, evidenced by the pointer 152. After suitably marking the magnitude and location of the counterbalancing weight on the tire rim, the balancing structure can then be dismantled from the wheel.

What is claimed is:

1. A wheel balancer comprising a base plate having an axis, a hub coaxially mounted on said base plate for rotation relative thereto, a diametrical weight projecting radially on opposite sides of said hub, means mounting said diametrical weight on said hub for radial movement relative thereto including a screw shaft diametrically shiftable in said hub and fixed against rotation in said diametrical weight, means preventing relative radial movement of said diametrical weight and said screw shaft, a driving shaft coaxially mounted in said hub for rotation relative thereto, and means interconnecting said screw shaft and said driving shaft for shifting said screw shaft diametrically relative to said hub in accordance with relative rotation of said driving shaft and said hub.

2. A wheel balancer comprising a base plate having an axis, a hub coaxially mounted on said base plate, balancing mechanism operably mounted on said hub for movement relative to said base plate, a driving shaft coaxially mounted in said hub for rotation relative thereto, a hollow driving shaft coaxially mounted in said hub for rotation relative thereto, operating means connecting said driving shafts and said balancing mechanism, a pair of opposed clutch drums, one on each of said shafts, and a free manual drum mounted for rotation about said axis relative to said hub and for shifting movement along said axis into engagement with one or the other of said clutch drums.

3. In a wheel balancer having a base plate, the combination of a hub, means mounting said hub on said base plate for rotation relative thereto, means on and engaging said hub and said base plate for rotating said hub on said base plate, an eccentric weight on and extending from one side of said hub and disposed with the center of gravity of said eccentric weight on a first imaginary line having a fixed polar location relative to said hub, a diametrical weight extending from both sides of said hub along a second imaginary line having the same polar location relative to said hub, means mounting said diametrical weight on said hub for movement along said second imaginary line, and means on and engaging said diametrical weight and said hub for moving said diametrical weight along said second imaginary line.

4. In a wheel balancer having a base plate, the combination of a hub, means mounting said hub on said base plate for rotation relative thereto about an axis, an eccentric weight on and extending from said hub and disposed with the center of gravity of said eccentric weight on a first imaginary line having a fixed polar location relative to said hub, a diametrical weight extending from both sides of said hub along a second imaginary line having the same polar location relative to said hub, means mounting said diametrical weight on said hub for movement along said second imaginary line between one position with the center of gravity of said diametrical weight on the same side of said axis as the center of gravity of said eccentric weight and another position with the center of gravity of said diametrical weight on the opposite side of said axis from the center of gravity of said eccentric weight, control means disposed on said axis and manually rotatable relative to said base plate, and means on said hub connecting said control means with said base plate and connecting said control means with said diametrical weight, respectively, and responsive to said control means for rotating said hub relative to said base plate and for moving said diametrical weight along said second imaginary line between said one position and said other position.

5. A wheel balancer comprising a base plate having an axis, a hub coaxially mounted on said base plate for rotation relative thereto, an eccentric weight on said hub, a gear coaxially fixed on said base plate, a pinion journalled in said hub and engaging said gear, a driving shaft coaxially mounted in said hub, driving means connecting said driving shaft and said pinion, means providing a first friction surface fixed on said driving shaft, a manually engageable drum having a second friction surface thereon, and means on said hub supporting said drum coaxially with said driving shaft for free rotation relative thereto and for axial movement into and out of frictional clutching engagement of said first and second friction surfaces.

6. A wheel balancer comprising a base plate having an axis, a hub coaxially mounted on said base plate for rotation relative thereto about said axis, a diametrical weight projecting on opposite sides of said hub, a screw shaft, means on said hub supporting said screw shaft for sliding movement along a diameter of said hub, means joining said screw shaft and said diametrical weight against relative rotation and diametrical displacement therebetween, a threaded sleeve engaging said screw shaft for rotation relative thereto, means constraining said sleeve against diametrical displacement relative to said hub, a driving shaft coaxially mounted in said hub, driving means connecting said driving shaft and said threaded sleeve, a friction member on said drive shaft, and clutching means on said hub engageable with said friction member.

7. A wheel balancer comprising a base plate having an axis, a hub coaxially mounted on said base plate for rotation relative thereto, a balancing mechanism operably mounted on said hub, a gear coaxially fixed on said base plate, a pinion journalled in said hub and engaging said gear, a driving shaft coaxially mounted in said hub, driving means connecting said driving shaft and said pinion, means providing a first friction surface fixed on said driving shaft, a manually engageable drum having a second friction surface thereon, and means on said hub supporting said drum coaxially with said driving shaft for free rotation relative thereto and for axial movement into and out of frictional clutching engagement of said first and second friction surfaces.

8. A wheel balancer comprising a base plate having an axis, a hub coaxially mounted on said base plate for rotation relative thereto, a balancing mechanism operably mounted on said hub, a gear coaxially fixed on said base plate, a pinion journalled in said hub and engaging said gear, a driving shaft coaxially mounted in said hub for rotation relative thereto, a hollow driving shaft coaxially mounted in said hub for rotation relative thereto, operating means connecting said driving shaft and said hollow driving shaft to said pinion, means providing a first friction surface fixed on said driving shaft, a manually engageable drum having second and third friction surfaces thereon, means providing a fourth friction surface fixed on said hollow driving shaft and opposed to said first friction surface, and means borne by said hub for supporting said drum coaxially with said driving shaft and said hollow driving shaft for rotation about said axis relative to said base plate and for shifting movement along said axis into engagement of said second friction surface with said first friction surface or said third friction surface with said fourth friction surface.

9. A wheel balancer comprising a base plate having an axis, a balancing mechanism operably mounted on said base plate for movement relative thereto, a shaft coaxially mounted on said base plate for rotation relative thereto, driving means connecting said driving shaft and said balancing mechanism for producing said movement of said balancing mechanism relative to said base plate upon said rotataion of said driving shaft relative to said base plate, means on said driving shaft providing a first circular friction surface coaxial with and fixed relative to said driving shaft, a manually engageable member having a second circular friction surface thereon, and means on said base plate supporting said member with said second circular friction surface disposed coaxially with said driving shaft for rotation of said member relative thereto and for axial movement of said member into and out of frictional clutching engagement of said first and second circular friction surfaces.

10. A base plate substantially symmetrical about an axis, a hub, means mounting said hub on said base plate for rotation relative thereto about said axis, a radially extending eccentric weight on said hub, the center of gravity of said eccentric weight being disposed in a predetermined plane containing said axis, means on and engaging said hub and said base plate for rotating said hub and said eccentric weight relative to said base plate, a diametrical weight extending radially on opposite sides of said hub, means mounting said diametrical weight on said hub for radial movement relative thereto with the center of gravity of said diametrical weight moving in said predetermined plane, means on and engaging said hub and said diametrical weight for moving said diametrical weight radially relative to said hub, a shield having an opening therein exposing to view a portion of said diametrical weight, and means securing said shield to said hub for rotation therewith.

11. A base plate substantially symmetrical about an axis, a hub, means mounting said hub on said base plate symmetrically about said axis and for rotation relative to said base plate, a radially extending eccentric weight on said hub, the center of gravity of said eccentric weight being disposed in a predetermined plane containing said axis, means on and engaging said hub and said base plate for rotating said hub and said eccentric weight relative to said base plate and about said axis, a diametrical weight extending radially on opposite sides of said hub, means mounting said diametrical weight on said hub in a position with the center of gravity of said diametrical weight in said predetermined plane, and means on and engaging said hub and said diametrical weight for moving said diametrical weight in a radial direction relative to said hub with the center of gravity of said diametrical weight moving in said plane and across said axis.

12. A base plate substantially symmetrical about an axis, an eccentric weight extending in a radial direction relative to said axis, the center of gravity of said eccentric weight being disposed in a predetermined plane containing said axis, means mounting said eccentric weight on said base plate for rotary movement relative thereto about said axis, a diametrical weight extending in a radial direction relative to said axis and on opposite sides thereof, means mounting said diametrical weight on said base plate for rotary movement relative thereto about said axis and for radial movement of the center of gravity of said diametrical weight in said predetermined plane and on opposite sides of said axis, means on and engaging said mounting means and said base plate for rotating said eccentric weight and said diametrical weight in one direction about said axis relative to said base plate, means on and engaging said mounting means and said base plate for rotating said eccentric weight and said diametrical weight in the opposite direction about said axis relative to said base plate, first manual means supported on said base plate and symmetrical about said axis for selectively operating either one of said weight rotating means, means on and engaging said mounting means and said diametrical weight for radially moving said diametrical weight in one direction, means on and engaging said mounting means and said diametrical weight for radially moving said diametrical weight in the opposite direction, and second manual means supported on said base plate and symmetrical about said axis for selectively operating either one of said diametrical weight moving means.

13. In a wheel balancer having a base plate, the combination of a hub, means mounting said hub on said base plate for rotation relative thereto, a radially extending eccentric weight on said hub in a predetermined polar position, means on and rotatably engaging said hub and said base plate for rotating said hub relative to said base plate, a diametrical weight extending radially on opposite sides of said hub, means on and engaging said hub and said diametrical weight mounting said diametrical weight on said hub in said predetermined polar position and for radial movement relative thereto, means on and rotatably engaging said diametrical weight and said hub for moving said diametrical weight radially relative to said hub, a shield having a radial opening therein in predetermined polar position and exposing a portion of said diametrical weight to view, and means securing said shield to said hub for rotation therewith.

14. A wheel balancer comprising a base plate having a first axis, a hub coaxially mounted on said base plate for rotation about said first axis, a threaded sleeve mounted in said hub and rotatable about a second axis disposed diametrically of said hub, means in said hub constraining said sleeve against displacement along said second axis, a screw shaft threaded through said sleeve and extending along said second axis, a diametrical weight symmetrical about said second axis and extending across said first axis, means interconnecting and engaging said diametrical weight and said screw shaft for moving said diametrical weight along said second axis upon rotation of said sleeve about said second axis, a driving shaft mounted in said hub coaxially with said first axis, driving means connecting said driving shaft and said rotatable sleeve, a friction member on said drive shaft, and clutching means on said hub engageable with said friction member.

(References on following page)

References Cited in the file of this patent

UNITED STATES PATENTS

| | | |
|---|---|---|
| 1,296,732 | Akimoff | Mar. 11, 1919 |
| 1,876,526 | Thearle et al. | Sept. 6, 1932 |
| 2,160,314 | Ongaro | May 30, 1939 |
| 2,241,637 | Ernst et al. | May 13, 1941 |
| 2,336,429 | Wenger | Dec. 7, 1943 |
| 2,372,891 | Fenton | Apr. 3, 1945 |
| 2,402,041 | Greenleaf et al. | June 11, 1946 |
| 2,475,502 | Holmes | July 5, 1949 |
| 2,662,396 | Hunter | Dec. 15, 1953 |
| 2,675,200 | Wohlforth | Apr. 13, 1954 |